March 22, 1955  K. D. RANDALL  2,704,409
MARKER FOR VEHICLE WINDOWS
Filed Oct. 20, 1951
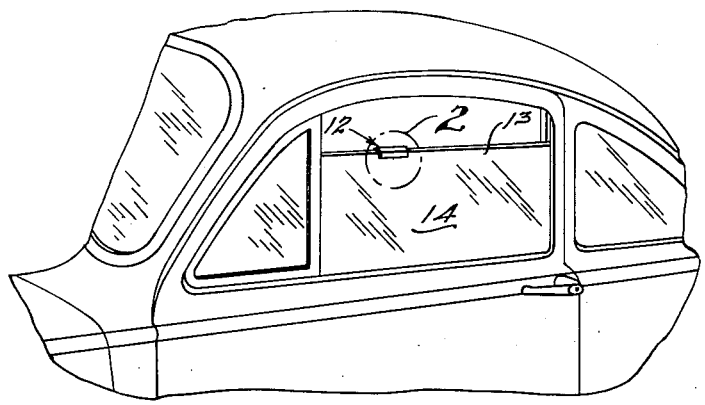
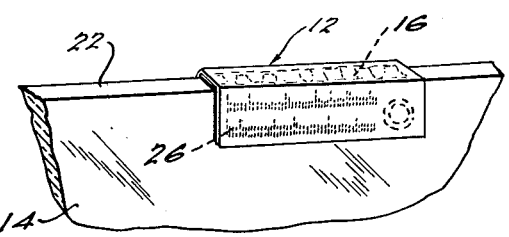
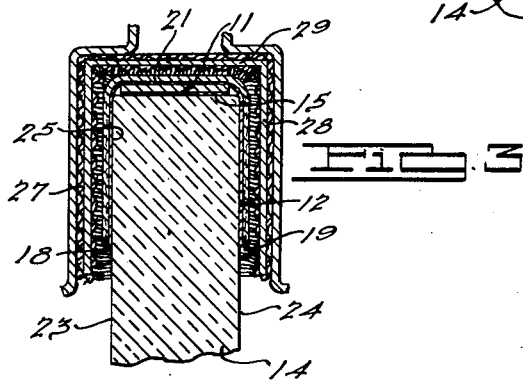
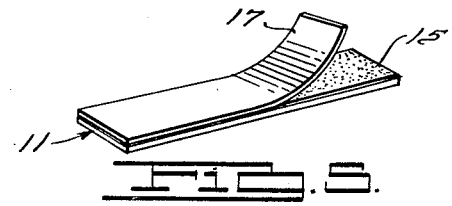
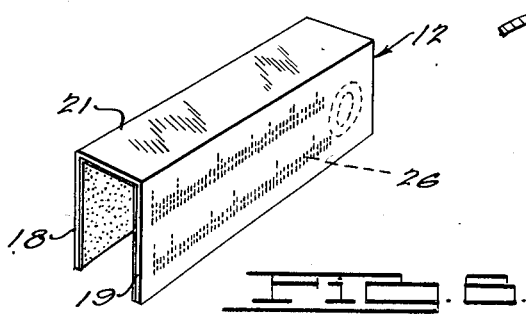
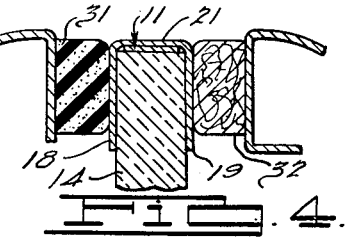
INVENTOR.
Kenneth D. Randall.
BY
Harness, Dickey & Pierce
ATTORNEYS.

United States Patent Office 2,704,409
Patented Mar. 22, 1955

2,704,409

MARKER FOR VEHICLE WINDOWS

Kenneth D. Randall, Detroit, Mich., assignor to Modern Displays, Detroit, Mich., a partnership Application October 20, 1951, Serial No. 252,369

4 Claims. (Cl. 40—2)

This invention relates to marking devices, and in particular to devices adapted for marking parts such as automotive vehicle windows with indicia useful in the servicing of such vehicles.

It is known that in the servicing of automotive vehicles it is often very beneficial for the service attendant to immediately recognize the owner of the vehicle so that the attendant may provide appropriate service and be able to quickly refer to records he may have showing the service history of the particular vehicle. A primary problem in providing such means of recognition has been the desire of the motorist that any markings or indicia be as inconspicuous as possible, so that during normal driving there will be no obtrusive display to mar the appearance of the vehicle.

It is an object of the present invention to overcome this problem and to provide an improved marking device especially adapted for installation on automotive vehicles to disclose information such as the owner's name, and which will nevertheless be entirely unobtrusive during normal driving conditions.

It is another object to provide an improved marking device of the above character, which is adapted for mounting on the upper edge of a vehicle window, and which will be entirely invisible when the window is in its raised position and only partially and unobtrusively visible when the window is lowered.

It is also an object to provide an improved marking device as described above, which may be inexpensively fabricated using conventional materials and may be easily installed on the vehicle.

Other objects, features, and advantages of the present invention will become apparent from the subsequent description, taken in conjunction with the accompanying drawings.

In the drawings:

Figure 1 is a perspective view of a vehicle window in a partially raised position and with the improved marking device of this invention;

Figure 2 is a fragmentary perspective view of a portion of the window in the area marked "A" in Figure 1, showing the marking device in place;

Figure 3 is a cross-sectional view through the window edge and weatherstrip, showing the relation of the weatherstrip and marking device when the window is closed;

Figure 4 is a cross-sectional view through the lower weatherstrip, showing the marker with the window down;

Figure 5 is a perspective view of the indicia member with the backing partially removed; and Figure 6 is a perspective view of securing member.

The invention comprises an indicia member 11 and a combined protective and securing member generally indicated at 12, these two members being adapted to be cooperatively mounted on the upper edge 13 of a conventional vehicle window 14. In the illustrated embodiment, the window 14 is shown as the left front window of the vehicle, since this window will usually be the most appropriate for the purpose of the marking device. However, it will be understood that the invention is equally applicable to the other windows of the vehicle.

The indicia member 11 preferably comprises a strip of paper having an adhesive back 15, of somewhat less width than the thickness of the window glass. The length of the paper strip is not critical although it is preferred that this length be sufficient to enable the strip to carry, for example, the name of the vehicle owner in the form of imprinted indicia 16. These indicia may be imprinted by typing or similar means, and for this purpose the strip 11 may originally form part of a roll (not shown) of strips, the strips being connected at their long edges along perforated lines. Moreover, if desired the strip may be of the gummed type having a removable backing 17 which may be peeled off to expose the adhesive surface 15.

The combined protective and securing member 12 is preferably formed of a length substantially greater than the length of strip 11. This securing member may be fabricated as an individual unit in such form as a decal, or may be taken as a length from a roll (not shown) of appropriate cellulose acetate tape. Member 12 comprises a pair of oppositely disposed leg sections 18 and 19 and an intermediate window section 21, these sections extending the entire length of the member. The securing member is adapted to overlie the indicia member 11, as shown in Figures 1 and 3, so that the latter member is securely held in place and is completely protected. Preferably, the window section 21 lies above the upper surface 22 of the window edge, and its width is approximately that of the glass thickness. Leg sections 18 and 19 extend downwardly along the inside and outside glass surfaces 23 and 24 respectively. The inner surface of the securing member is provided with an adhesive coating 25, and it will therefore be seen that legs 18 and 19 are firmly secured to the window 14 to hold the device in place. The leg sections 18 and 19 are preferably opaque, and the outer section 19 may be provided if desired with additional printed indicia 26 comprising for example educational or advertising matter, or the title and symbol of an appropriate organization.

In order to insure the unobtrusiveness of the marking device, the width of leg sections 18 and 19 is preferably less than the width of the respective side walls 27 and 28 of the window weatherstrip 29. It will be seen in Figure 3 that when the window is in its raised position, the marking device will thus be entirely concealed by the weatherstrip, no part of the device being visible from either the inside or the outside. It will be observed that the nature of the marking device, which is composed solely of thin materials, is such that it will not interfere in any way with the closing or opening of the window. When the window is in its lowered position shown in Figure 4, it is obvious that the leg portions 18 and 19 will likewise be concealed by the weatherstrips 31 and 32 respectively, and only the window edge 22 and the indicia strip 11 will be approximately flush with the molding edge when the window is fully open, this will result in an unobtrusive positioning for the marking device.

It will thus be seen that a novel and improved marking device has been provided which enables a service attendant to quickly ascertain the necessary information concerning a car owner, as the attendant approaches the vehicle. This is so because in practically all instances the driver will lower his window when approaching the location of the servicing facilities. Whether he lowers the window partially or totally, the indicia member 11 will be immediately visible to the service attendant.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a marking device for vehicle windows of the type having a recessed weatherstrip for receiving the upper edge of the window when raised, an indicia strip with an adhesive backing adapted to lie along the upper edge of the window, and a combined protective and securing member of substantially greater length than said indicia strip, said securing member having a transparent section overlying said indicia strip and a pair of oppositely disposed adhesive leg sections adapted to engage the window side surfaces, the thickness of said securing member being sufficiently small to allow the member to be inserted into said recessed weatherstrip when in position on the window, the width of said leg sections being substantially equal and less than the depth of said recessed weatherstrip, whereby said leg sections are adapted to be substantially concealed by said weatherstrip recess when the window is in raised position.

2. In combination, a window, supporting means for permitting sliding movement of said window between a raised and a lowered position, a weatherstrip having a recess for receiving the upper edge of said window when in its raised position, an indicia strip disposed along the upper edge of said window, and a combined protective and securing member overlying said indicia strip, said securing member having a pair of oppositely disposed adhesive leg sections gripping the side surfaces of the window and an interconnecting transparent section overlying said indicia strip, the thickness of said securing member being sufficiently small to allow the member to be inserted into said recessed weatherstrip when in position on the said window, the width of said leg sections being substantially equal and less than the depth of said weatherstrip recess, said leg sections being substantially concealed by said weatherstrip recess when the window is in raised position.

3. In a marking device for a vehicle window of the type having a substantially straight upper edge and a recessed weatherstrip for receiving said upper edge when the window is raised, an indicia member adapted to lie along the upper edge of the window, and a securing member overlying said indicia member, said securing member having a transparent section through which said indicia member is visible and a pair of oppositely disposed leg sections adapted to lie flush with and grip the inner and outer surfaces of the window, the thickness of said securing member being sufficiently small to allow the member to be inserted into said recessed weatherstrip when in position on the window, the width of said leg sections being substantially equal and less than the depth of the weatherstrip recess, whereby said leg sections are adapted to be substantially concealed by said weatherstrip recess when the window is in raised position.

4. The combination according to claim 1, said oppositely disposed adhesive leg sections being opaque, at least one of said opaque sections being adapted to bear printed indicia thereon visible when said section is exposed.

References Cited in the file of this patent

UNITED STATES PATENTS

| | | |
|---|---|---|
| 1,229,877 | Bronner | June 12, 1917 |
| 1,375,914 | Kimbark | Apr. 26, 1921 |
| 1,382,054 | Blair | June 21, 1921 |
| 1,785,780 | Maish | Dec. 23, 1930 |
| 1,812,751 | Mensman | June 30, 1931 |
| 1,938,944 | Tussing | Dec. 12, 1933 |
| 2,213,666 | Burke | Sept. 3, 1940 |